US012394941B2

(12) United States Patent
Hashimoto et al.

(10) Patent No.: US 12,394,941 B2
(45) Date of Patent: Aug. 19, 2025

(54) SOCKET FOR ELECTRONIC COMPONENT INCLUDING LOCATING SPRING

(71) Applicant: Tyco Electronics Japan G.K., Kawasaki (JP)

(72) Inventors: Naoki Hashimoto, Kawasaki (JP); Masashi Inoue, Kawasaki (JP)

(73) Assignee: TE Connectivity Japan G.K., Kawasaki (JP)

( * ) Notice: Subject to any disclaimer, the term of this patent is extended or adjusted under 35 U.S.C. 154(b) by 350 days.

(21) Appl. No.: 17/946,080

(22) Filed: Sep. 16, 2022

(65) Prior Publication Data

US 2023/0080167 A1 Mar. 16, 2023

(30) Foreign Application Priority Data

Sep. 16, 2021 (JP) ................................ 2021-151103

(51) Int. Cl.

*H01R 13/24* (2006.01)
*H01R 12/70* (2011.01)
*H01R 12/71* (2011.01)
*H01R 13/64* (2006.01)
*H01R 13/50* (2006.01)

(52) U.S. Cl.

CPC ......... *H01R 13/64* (2013.01); *H01R 12/7082* (2013.01); *H01R 12/714* (2013.01); *H01R 13/2435* (2013.01); *H01R 12/716* (2013.01); *H01R 13/50* (2013.01)

(58) Field of Classification Search

CPC .. H01R 13/64; H01R 12/7082; H01R 12/714; H01R 13/2435; H01R 13/50; H01R 13/24

See application file for complete search history.

(56) References Cited

U.S. PATENT DOCUMENTS 6,164,980 A 12/2000 Goodwin
6,905,377 B2 6/2005 Murr
(Continued)

FOREIGN PATENT DOCUMENTS

CN 1505210 A 6/2004
JP H11317272 A 11/1999
(Continued)

OTHER PUBLICATIONS

Japanese Office Action dated Apr. 18, 2025 with English translation, corresponding to Application No. 2021-151103, 11 pages.

*Primary Examiner* — Michael C Zarroli
(74) *Attorney, Agent, or Firm* — Barley Snyder

(57) ABSTRACT

A socket includes a housing with a bottom plate portion and a frame body portion standing at edges of the bottom plate portion and extending along the edges. The frame body portion serves as a locator in an in-plane direction of the bottom plate portion in mounting an electronic component. The bottom plate portion and the frame body portion are integrally molded into the housing. The socket includes a plurality of contacts supported by the bottom plate portion. The socket includes a spring member including a supported portion supported by a first side of the frame body portion and a spring portion that elastically deforms by being pushed by the electronic component, pressing the electronic component against a second side opposite to the first side.

20 Claims, 10 Drawing Sheets

(56) References Cited

U.S. PATENT DOCUMENTS

| | | | | |
|---|---|---|---|---|
| 7,785,112 | B2 * | 8/2010 | Hashimoto | H01R 12/7076 439/66 |
| 2009/0042412 | A1 | 2/2009 | Hashimoto et al. | |
| 2009/0286417 | A1 * | 11/2009 | Taguchi | H05K 7/1007 439/331 |
| 2010/0261372 | A1 | 10/2010 | Chang | |
| 2011/0195589 | A1 | 8/2011 | Takahashi | |
| 2021/0126394 | A1 * | 4/2021 | Hashimoto | H05K 3/3457 |
| 2021/0257765 | A1 * | 8/2021 | Yamada | H01R 13/03 |

FOREIGN PATENT DOCUMENTS

| | | | |
|---|---|---|---|
| JP | 2005174901 | A | 6/2005 |
| JP | 2007103311 | A | 4/2007 |
| JP | 2011165512 | A | 8/2011 |
| JP | 2021072175 | A | 5/2021 |

* cited by examiner

SOCKET FOR ELECTRONIC COMPONENT INCLUDING LOCATING SPRING

CROSS-REFERENCE TO RELATED APPLICATION

This application claims the benefit of the filing date under 35 U.S.C. § 119(a)-(d) of Japanese Patent Application No. 2021-151103, filed on Sep. 16, 2021.

FIELD OF THE INVENTION

The present invention relates to a socket into which an electronic component having a two-dimensional array of contact pads on a bottom surface thereof is fitted.

BACKGROUND

When a circuit board is mounted with a large-scale electronic component, the electronic component is usually mounted via a socket instead of being directly soldered to the circuit board. That is, the electronic component is usually fitted into the socket after the socket has been positioned on top of the circuit board. The socket includes a large number of contacts, arrayed in such a manner as to project from a first surface of a flat-plate housing, that make contact separately with each of contact pads arrayed on a bottom surface of the electronic component.

Japanese Patent Application No. 2021-072175A discloses a socket including a flat-plate housing having a large number of contacts arrayed and a frame body, attached to the housing, that extends along edges of the housing and locates a mounted electronic component by touching side surfaces of the electronic component. This socket of JP 2021-072175A increases the positional accuracy of mounting of the mounted electronic component by positioning a spring member on one side of the frame body and pressing the electronic component against a side opposite to the side on which the spring member is positioned.

The socket of JP 2021-072175A has a structure in which the frame body is attached to the flat-plate housing. This makes it necessary to account for a tolerance of attachment of the frame body to the housing, and to the extent of such a tolerance, a decrease in positional accuracy of mounting of the electronic component is inevitable.

Further, this socket of JP 2021-072175A cannot press the electronic component directly against the first surface of the housing and makes it necessary to position a seat member on top of the housing and mount the electronic component while keeping it appropriately away from the housing. This causes a decrease in positional accuracy of the electronic component in a height direction to the extent of a tolerance of height of the seat member.

Furthermore, this socket of JP 2021-072175A makes it necessary to array solder balls on a second surface of the housing, thus making it impossible to bring the circuit board, to which the socket is to be soldered, into close contact with the second surface of the housing and making it necessary to position a standoff member on the second surface of the housing to keep an appropriate distance between the second surface of the housing and the circuit board.

Thus, this socket of JP 2021-072175A is structured to have many types of components and be assembled through a large number of steps.

SUMMARY

A socket includes a housing with a bottom plate portion and a frame body portion standing at edges of the bottom plate portion and extending along the edges. The frame body portion serves as a locator in an in-plane direction of the bottom plate portion in mounting an electronic component. The bottom plate portion and the frame body portion are integrally molded into the housing. The socket includes a plurality of contacts supported by the bottom plate portion. The socket includes a spring member including a supported portion supported by a first side of the frame body portion and a spring portion that elastically deforms by being pushed by the electronic component, pressing the electronic component against a second side opposite to the first side.

BRIEF DESCRIPTION OF THE DRAWINGS

The invention will now be described by way of example with reference to the accompanying Figures, of which.

DETAILED DESCRIPTION OF THE EMBODIMENTS

Figure 1A:
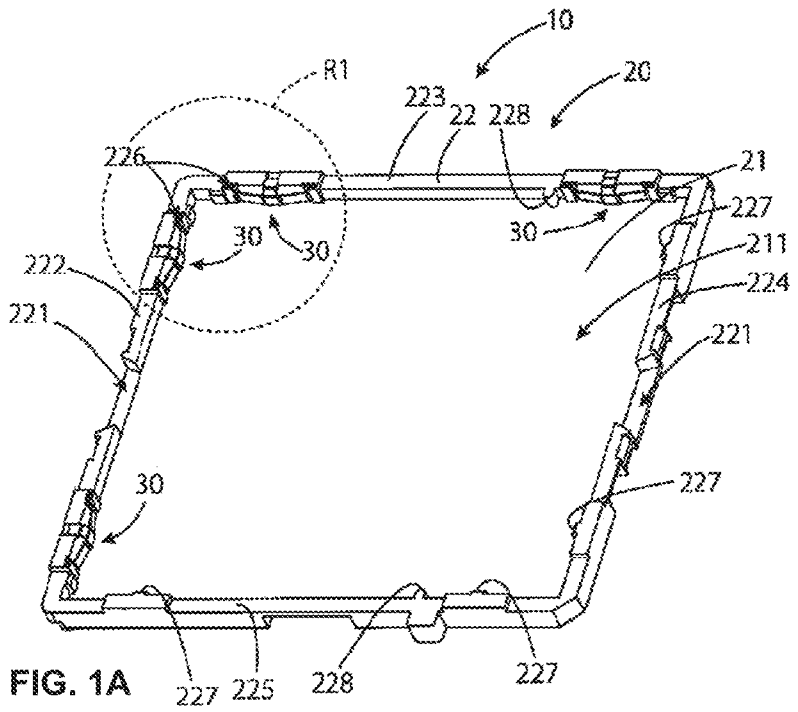
FIG. 1A is an isometric view of a socket according to a first embodiment.
Figure 1B:
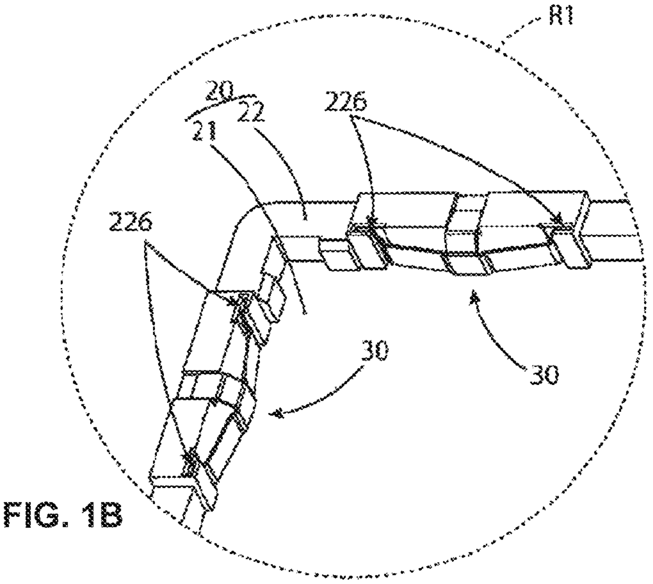
FIG. 1B is an enlarged view of a portion in a circle R1 of FIG. 1A.
Figure 2A:
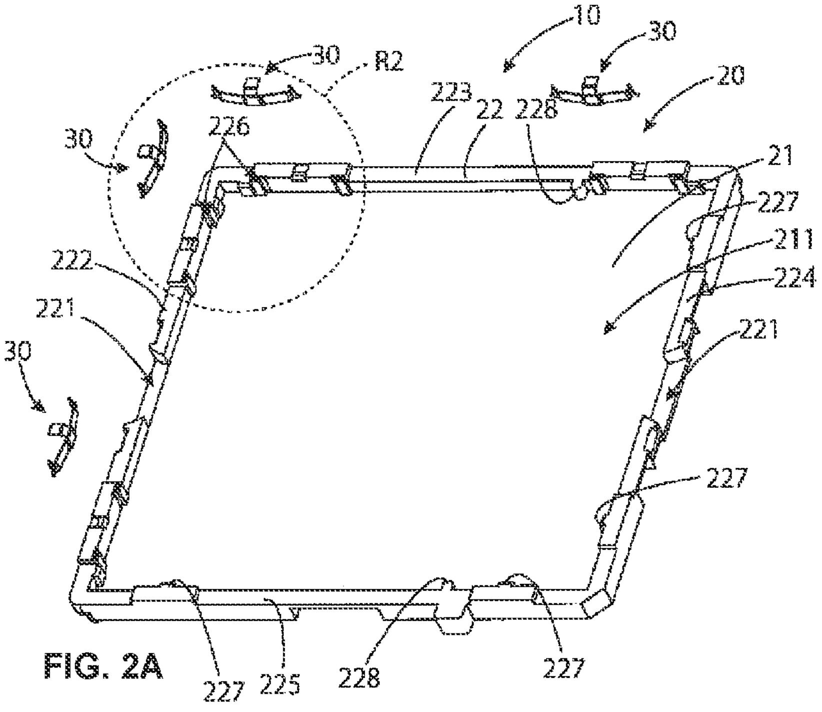
FIG. 2A is an exploded isometric view of the socket of FIG. 1A.
Figure 2B:
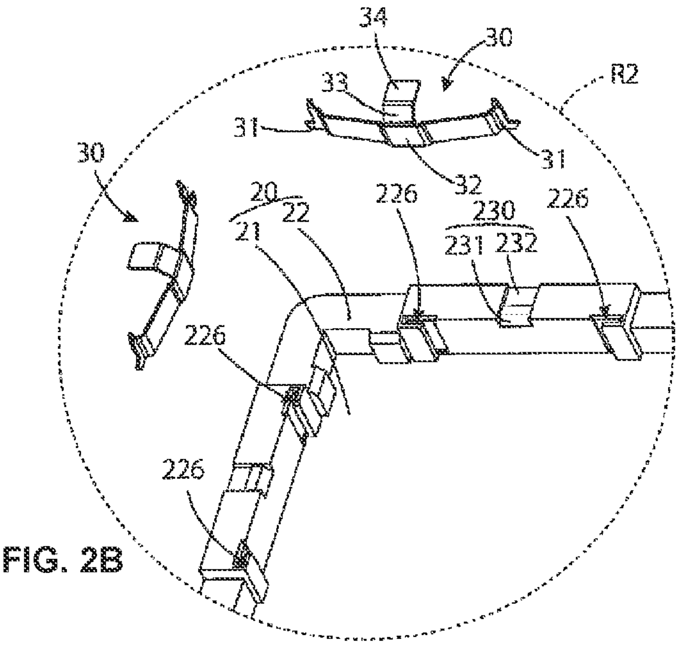
FIG. 2B is an enlarged view of a portion in a circle R2 of FIG. 2A.

Embodiments of the invention will be described below. Various elements in the drawings are merely schematically and illustratively shown for understanding of the present disclosure and may differ in outward appearance and/or dimensional ratio from actual ones. Furthermore, the following description uses, on an as-needed basis, terms that indicate particular directions or positions. However, the use of these terms is intended to facilitate understanding of the invention with reference to the drawings, and the meanings of these terms are not intended to limit the technical scope of the present disclosure. Further, components given identical reference signs throughout a plurality of drawings refer to identical or equivalent components.

A socket 10 according to an embodiment, shown in FIGS. 1A-2B, includes a housing 20 and a spring member 30. The housing 20 includes a bottom plate portion 21 and a frame body portion 22, and is a molded article into which the bottom plate portion 21 and the frame body portion 22 are integrally molded, for example from an identical material or an identical blend of components. Note, however, that the bottom plate portion 21 and the frame body portion 22 may be molded articles molded in two colors from different materials or different blends of components.

The bottom plate portion 21 has a first surface 211 and a second surface 212 (see FIGS. 7A-C) that spread parallel to each other. Of these surfaces, only the first surface 211 appears in FIGS. 1A-2B. The second surface 212 is the opposite side to the first surface 211. The bottom plate portion 21 has an array of a plurality of, e.g. as many as 10,000, contact support holes 213 (see FIGS. 7A-C), and in each of at least any plurality of contact support holes 213, contacts 40 are plugged one by one. FIGS. 1A-2B omit the illustration contact support holes or contacts of the housing 20.

The frame body portion 22 stands at edges of the first surface 211 of the bottom plate portion 211 and extends substantially all around along the edges. Note, however, that for convenience of removal of a mounted electronic component 50 (see FIGS. 4A and 4B), notched portions 221 in which the frame body portion 22 is not present are formed in two places, one on the right side and the other on the left side, respectively.

The frame body portion 22 acts together with the spring member 30, which will be described below, as a locator in mounting the electronic component 50 in an in-plane direction of the first surface 211. Further, the frame body portion 22 has protruding portions 228, formed on at least one side, in an embodiment two or more sides 223 and 225, of the frame body portion 22, that project inward. The formation of these protruding portions 228 allows the electronic component 50 to be mounted only when the electronic component 50 is in a correct orientation (see FIGS. 4A and 4B).

On at least any of the left and upper sides 222 and 223 of FIGS. 1A-2B of the four sides of the frame body portion 22, at least one, and in an embodiment two, spring members 30 is positioned on each of the sides (222 and 223). On those sides 222 and 223, slit-like supporting portions 226 for supporting the spring members 30 are formed separately in correspondence with each of the spring members 30.

Further, the sides (224 and 225) of the four sides of the frame body portion 22 opposite to the sides (222 and 223) on which the spring members 30 are positioned, receiving portions 227 bulging inward are formed in positions separately facing each of the spring members 30. These receiving portions 227 are abutted by the mounted electronic component 50 being pushed by the spring members 30.

Each of the spring members 30 has a shape extending from side to side as a whole, and includes supported portions 31, provided on both the right and left sides, that are supported by being inserted into the slit-like supporting portions 226 of the frame body portion 22 and a spring portion 32, provided in the center, that projects toward the opposite side (224 or 225). Further, each of the spring members 30 further includes an inviting portion 33, shown in FIG. 2B, obliquely rising onto the side (222 or 223) of the frame body portion 22 on which the spring member 30 is supported and an extension portion 34 that extends toward the outside of the frame body portion 22. Correspondingly, the frame body portion 22 has a mounting portion 230 having an inclined surface 231 and an upward surface 232. The inviting portion 33 invites the mounted electronic component 50 into the frame body portion 22, thereby making it easy to mount the electronic component 50.

Figure 4A:
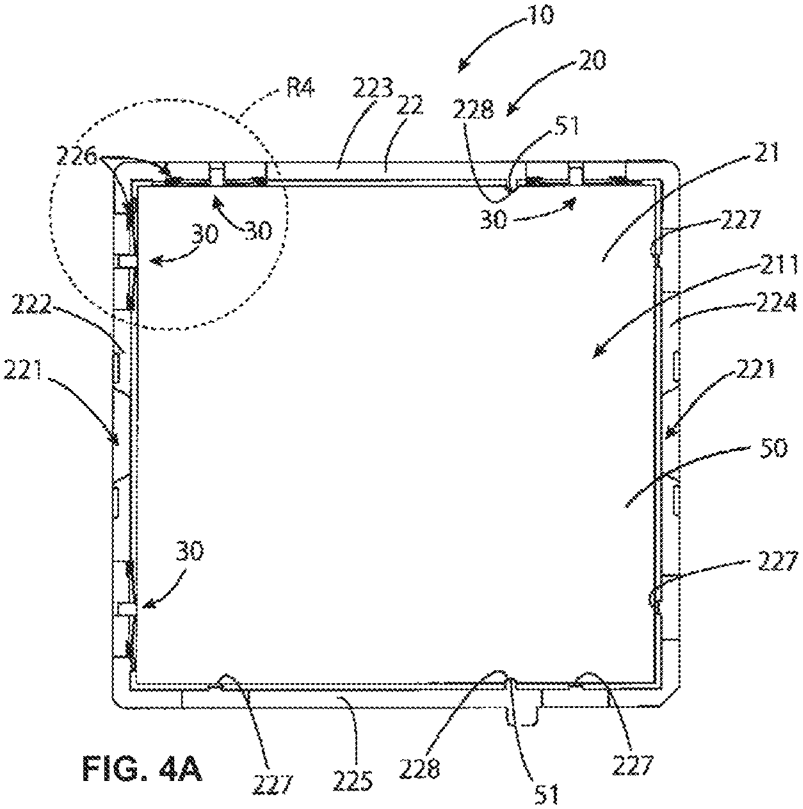
FIG. 4A is a top view of an electronic component mounted in the socket of FIG. 1A.

As shown in FIG. 4A, the electronic component 50 has long grooves 51 formed in positions corresponding to the protruding portions 228 of the frame body portion 22. When the electronic component 50 is mounted into the socket 10, the electronic component 50 is mounted in such an orientation that the protruding portions 228 of the frame body portion 22 fit into the long grooves 51 of the electronic component 50, so that the electronic component 50 is not mounted in a wrong orientation other than that orientation.

Figure 3A:
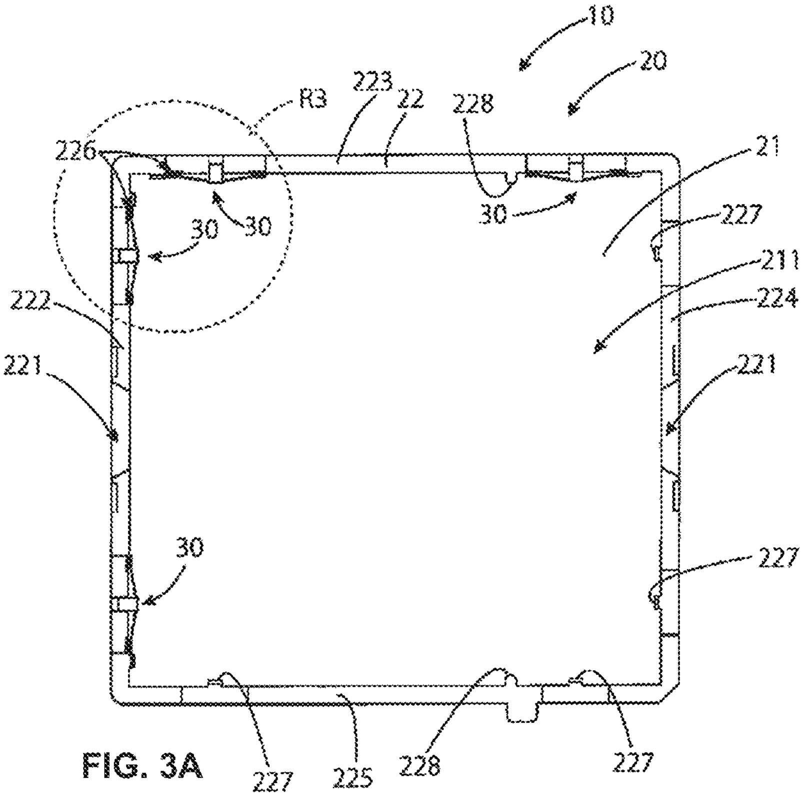
FIG. 3A is a top view of the socket of FIG. 1A.
Figure 3B:
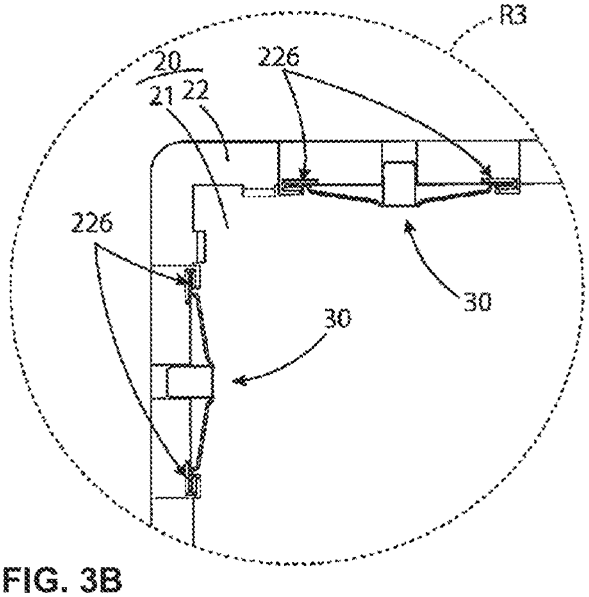
FIG. 3B is an enlarged view of a portion in a circle R3 in FIG. 3A.
Figure 4B:
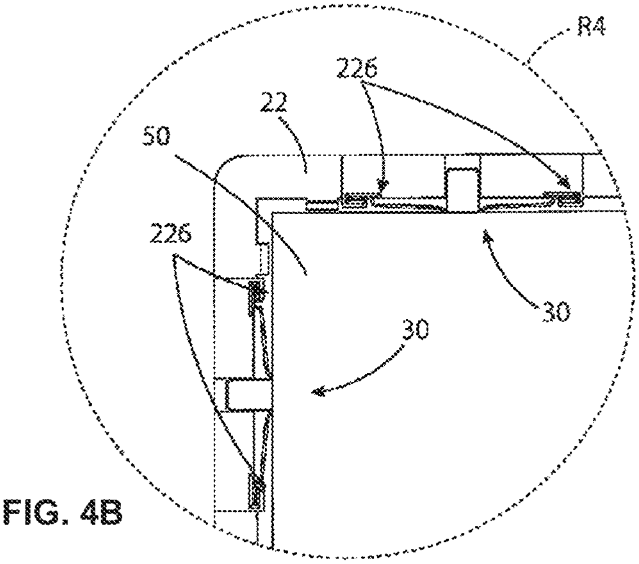
FIG. 4B is an enlarged view of a portion in a circle R4 in FIG. 4A.

Further, a comparison between FIG. 3B and FIG. 4B shows that once the electronic component 50 is mounted, the spring portions 33 of the spring members 30 elastically deform by being pushed toward the sides of the frame body portion 22 on which the spring members 30 are supported. The electronic component 50 is pressed against the receiving portions 227 by being pushed toward the opposite sides by a reaction force. This causes the electronic component 50 to be located with high accuracy in the in-plane direction of the first surface 211.

Note here that the sides (222 and 223) of the frame body portion 22 on which the spring members 30 are supported are equivalent to what is called "first side" according to the invention, and the sides (224 and 225) opposite to those sides (222 and 223) on which the receiving portions 227 are formed are equivalent to what is called "second side" according to the invention.

Figure 5A:
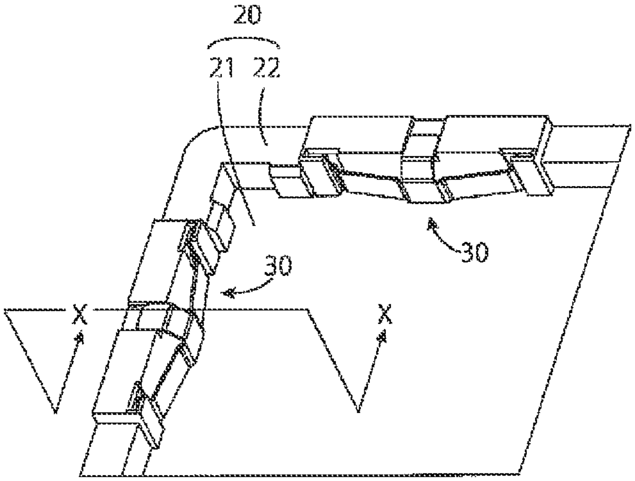
FIG. 5A is an enlarged view of a portion of the socket of FIG. 1A.
Figure 5B:
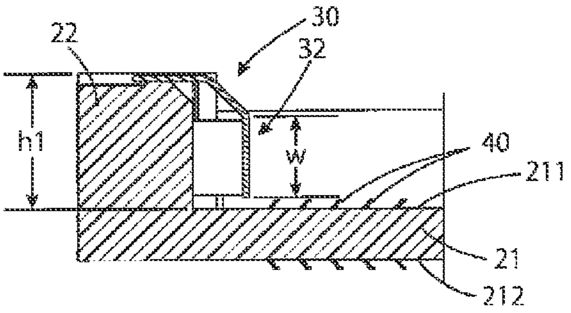
FIG. 5B is a sectional side view of the portion of the socket of FIG. 5A, taken along line X-X.

FIG. 5B shows a cross-section of a spring member 30, shown in a perspective view in FIG. 5A. FIG. 5B also shows contacts 40 projecting upward and downward from the bottom surface portion 21 of the housing 20. Once mounted, the electronic component 50 makes direct contact with the first surface 211 of the bottom plate portion 21. On the other hand, the spring member 30 is positioned in a slightly higher position than the first surface 211 without touching the first surface 211. FIG. 5 is referred to in describing a second embodiment (see FIGS. 8A and 8B).

Figure 6A:
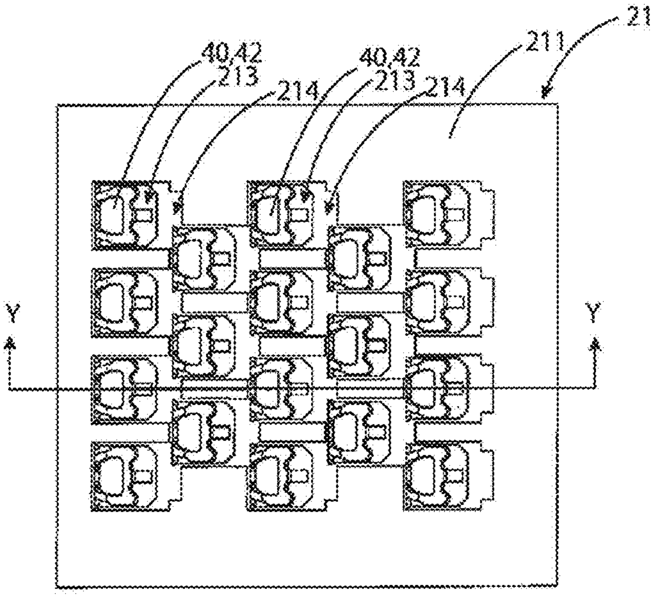
FIG. 6A is a top view of a bottom plate portion of a housing of the socket.
Figure 6B:
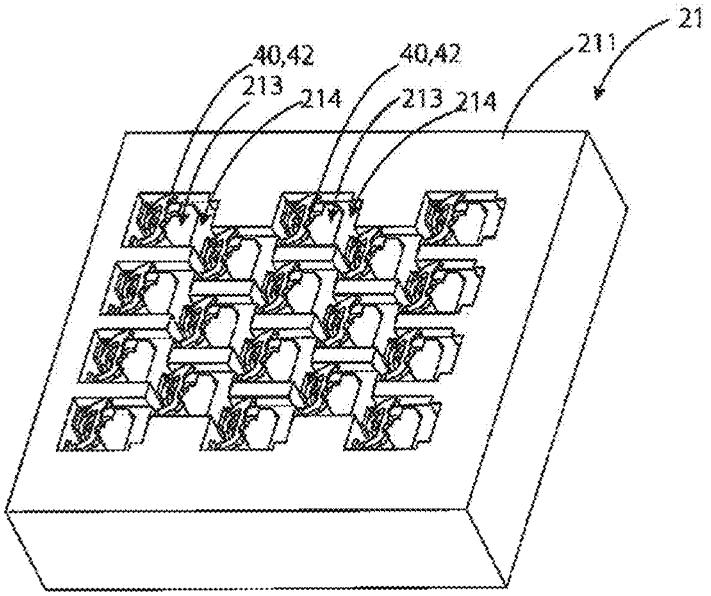
FIG. 6B is an isometric view of the bottom plate portion of FIG. 6A.
Figure 7A:
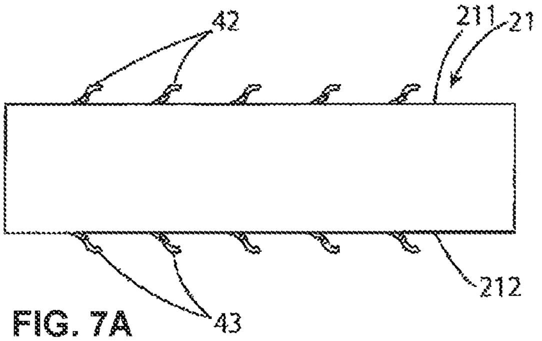
FIG. 7A is a front view of a part of the bottom plate portion of the housing of the socket of FIG. 6A.
Figure 7B:
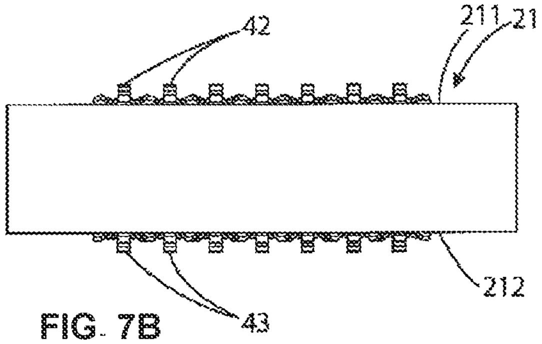
FIG. 7B is a side view of the bottom plate portion of the housing.
Figure 7C:
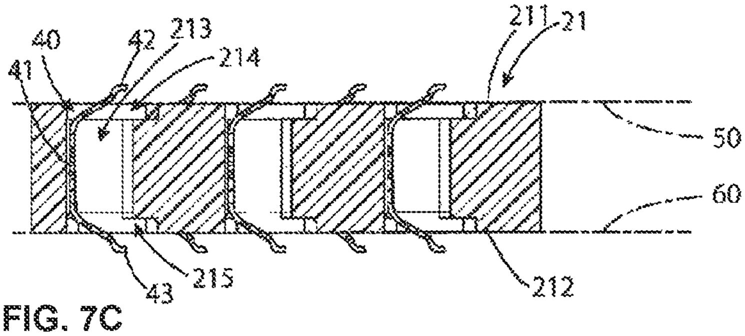
FIG. 7C is a sectional front view of the bottom plate portion of the housing, taken along line Y-Y of FIG. 6A.

FIG. 7A is a front view of part of the bottom plate portion of the housing shown in FIG. 6, a side view is shown in FIG. 7B, and a cross sectional view is shown in FIG. 7C taken along line Y-Y shown in FIG. 6A. FIG. 7C clarifies a positional relationship with the bottom plate portion 21 of the housing 20 by showing a lower surface of the electronic component 50 with the electronic component 50 mounted in the socket 10 and an upper surface of a circuit board 60 with the socket 10 mounted on the circuit board 60.

The bottom plate portion 21 of the housing 20 has, for example, ten thousand contact support holes 213 formed therein, and into each of the contact support holes 213, the contacts 40 are plugged one by one to be supported by walls of the contact support holes 213.

Each of the contacts 40, as shown in FIG. 7C, includes a plugged portion 41 plugged into a corresponding one of the contact support holes 213, a first contact portion 42 projecting toward the first surface 211 of the bottom plate portion 21, and a second contact portion 43 projecting toward the second surface 212 of the bottom plate portion 21. The plugged portion 41 is a portion that is plugged into the contact support hole 213 and supported by the bottom plate portion 21. The first contact portion 42 serves as an electrical contact with the electronic component 50 mounted in the socket 10. Further, the second contact portion 43 serves as an electrical contact with the circuit board 60 on which the socket 10 is mounted.

Once mounted in the socket 10, a bottom surface of the electronic component 50 makes direct contact with the first surface 211 of the bottom plate portion 21. For this reason, the bottom plate portion 211 has a first depressed portion 214 formed in a position on the first surface 211 adjacent to a corresponding one of the contact support holes 213, as shown in FIG. 7C. Once the electronic component 50 is mounted in the socket 10, the first contact portion 42 is accommodated in the first depressed portion 214 after having elastically deformed by being pushed by the electronic component 50 thus mounted. This makes it unnecessary to keep the electronic component 50 at a certain distance from the bottom plate portion 21 by positioning a seat member or other members on top of the bottom plate portion 21, so that the electronic component 50 is located with high accuracy accordingly in an up-and-down direction.

Further, similarly, once the socket 10 is placed on top of the circuit board 60, the second surface 212 of the bottom plate portion 21 makes direct contact with the circuit board 60. For this reason, the bottom plate portion 21 has a second depression portion 215 formed in a position adjacent to the contact support hole 213, as shown in FIG. 7C. Once the socket 10 is placed on top of the circuit board 60, the second contact portion 42 is accommodated in the second depressed portion 215 after having elastically deformed by being pushed by the circuit board 60.

This is the end of the foregoing description of the first embodiment, and the following describes the second embodiment and subsequent embodiments. It should be noted that the second embodiment and subsequent embodiments are illustrated and described in terms of differences from the first embodiment. Note, however, that the second embodiment and subsequent embodiments are given the same signs as those used in the description of the first embodiment.

Figure 8A:
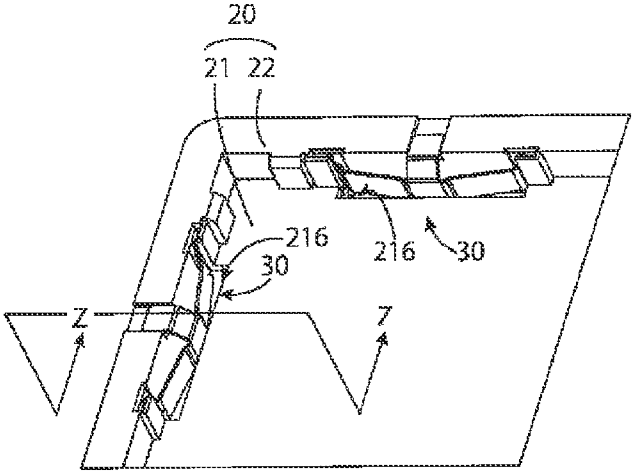
FIG. 8A is an enlarged isometric view of a part of a socket according to a second embodiment.
Figure 8B:
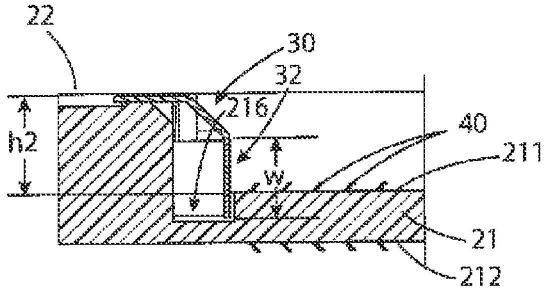
FIG. 8B is a sectional side view of the socket of FIG. 8A, taken along line Z-Z.

In the case of the first embodiment, as shown in FIG. 5B, the spring member 30 is positioned in a slightly higher position than the first surface 211 of the bottom plate portion 21 without touching the first surface 211. On the other hand, in the case of the second embodiment, a recessed portion 216 is formed in a place in the first surface 211 of the bottom plate portion 21 in which the spring member 30 is positioned, as shown in FIGS. 8A and 8B. The spring member 30 is supported by the frame body portion 22 while being partially stuck in the recessed portion 216. Moreover, a height h2 from the first surface 211 of the frame body portion 22 is lower than a height h1 of the frame body portion 22 of the first embodiment shown in FIG. 5. Note, however, that a width w of the spring portion 32 is equal to a width w of the spring portion 32 of the first embodiment.

As a socket 10 into which an electronic component 50 that is small in thickness in a height direction is mounted, a socket 10 whose frame body portion 22 is low in height h2 is employed. In this case, employing a spring member 30 that is narrow in width w may weaken a spring force. Accordingly, in the second embodiment, a recessed portion 216 is formed so that part of a spring member 30 is positioned in such a position as to be stuck in the recessed portion 216. This makes it possible to, while ensuring a sufficient spring force by using a spring member 30 that is identical to that of the first embodiment, achieve a socket 10 whose frame body portion 22 is low in height.

Figure 9A:
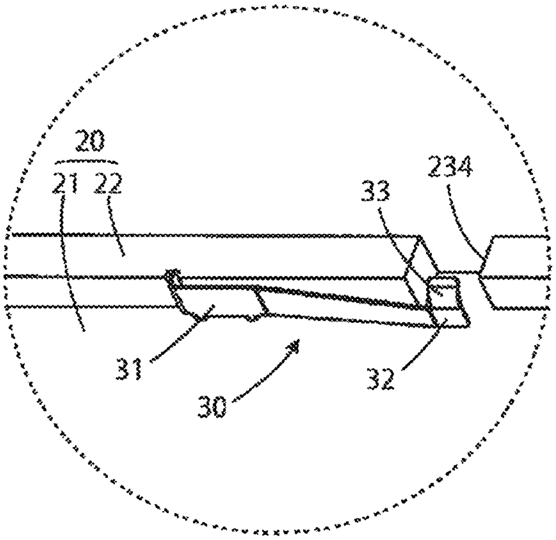
FIG. 9A is an isometric view of a spring member according to a third embodiment.
Figure 9B:
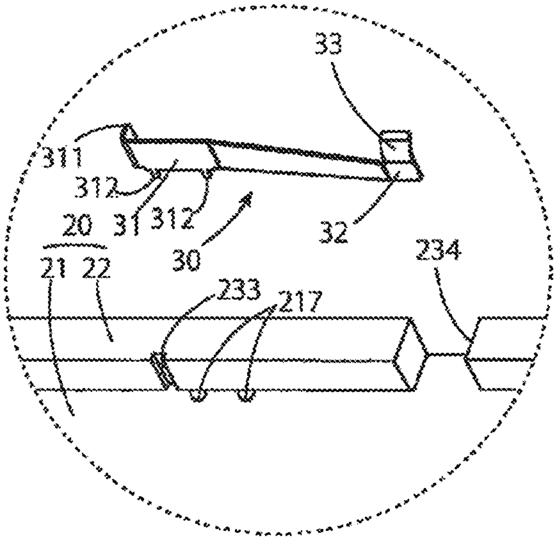
FIG. 9B is an exploded isometric view of the spring member of FIG. 9A.

FIG. 9A shows a state where the spring member 30 is supported by the housing 20 and FIG. 9B is an exploded view of FIG. 9A. Each of the spring members 30 according to the first and second embodiment hitherto described is a spring member having the shape of a double-fixed beam having supported portions 31 provided on both the right and left sides. On the other hand, the spring member 30 of a third embodiment in FIGS. 9A and 9B is a spring member having the shape of a cantilever having a supported portion 31 provided either of the right and left sides. For example, as shown in FIGS. 9A and 9B, a supported portion 31 is provided on the left side and extends obliquely inward toward the right side, and a spring portion 32 is provided at a free end situated away from the side of the frame body portion 22 on which the spring member 30 is supported. Moreover, an inviting portion 33 formed obliquely upward is provided on top of the spring portion 32.

Further, in the third embodiment of FIGS. 9A and 9B, the frame body portion 22 has a slit 233 formed therein, and the bottom plate portion 21 has support holes 217 formed in places adjacent to the frame body portion 22. Correspondingly, the supported portion 31 of the spring member 30 is provided with a folded portion 311 and projecting portions 312. The spring member 30 is supported by the folded portion 311 being inserted into the slit 233 and the projecting portions 312 being inserted into the support holes 217. Further, the frame body portion 22 has a notched portion 234 formed therein so as not to prevent the spring member 30 from elastically deforming when an electronic component is mounted into the socket 10.

Figure 10A:
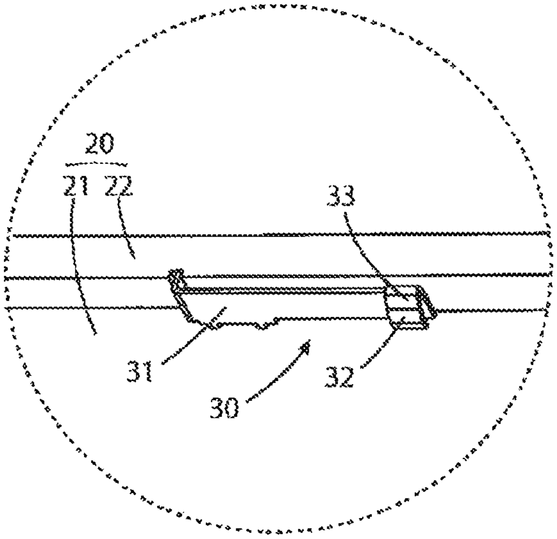
FIG. 10A is an isometric view of a spring member according to a fourth embodiment.
Figure 10B:
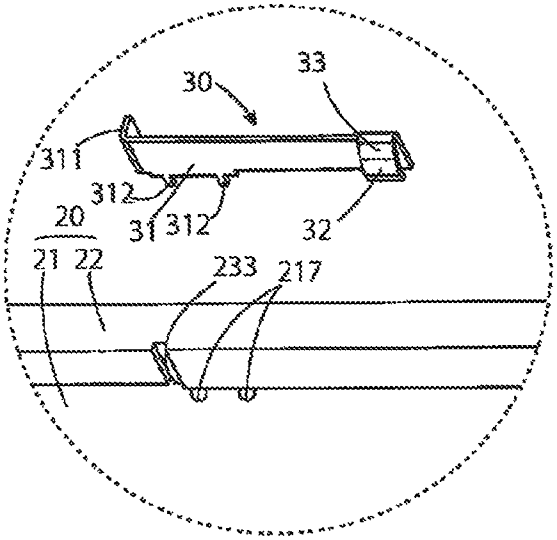
FIG. 10B is an exploded isometric view of the spring member of FIG. 10A.

FIGS. 10A and 10B show a spring member according to a fourth embodiment; FIG. 10A shows a state where the spring member 30 is supported by the housing 20. The spring member 30 of the fourth embodiment has a supported portion 31, provided on the left side of FIG. 10, that extends rightward along the side of the frame body portion 22 on which the spring member 30 is supported and, furthermore, has its right free end folded inward so that a spring portion 32 is provided. Moreover, an inviting portion 33 formed obliquely upward is provided on top of the spring portion 32. A supporting structure of the spring member 30 of the fourth embodiment is identical to that of the third embodiment, and a description of the supporting structure is omitted.

As in the cases of the third embodiment shown in FIGS. 9A and 9B and the fourth embodiment shown in FIGS. 10A and 10B, the spring member 30 may have the shape of a cantilever.

The foregoing socket according to the invention makes it possible to reduce the number of types of components and improve the positional accuracy of mounting of an electronic component.

What is claimed is:

1. A socket, comprising:

a housing including a bottom plate portion having a first surface and a second surface that are parallel to each other and an array of a plurality of contact support holes bored through the first surface and the second surface, and a frame body portion standing at edges of the first surface and extending along the edges, the frame body portion serving as a locator in an in-plane direction of the first surface in mounting an electronic component having a plurality of contact pads formed on a lower surface of the electronic component, the bottom plate portion and the frame body portion are integrally molded into the housing;

a plurality of contacts supported by the bottom plate portion while being plugged in the contact support holes, each of the contacts including:

a plugged portion plugged in one of the contact support holes;

a first contact portion having a free end projecting and positioned beyond the first surface and adapted to contact the electronic component; and a second contact portion having a free end projecting and positioned beyond the second surface and adapted to contact a circuit board; and a spring member including a supported portion supported by a first side of the frame body portion and a spring portion that elastically deforms by being pushed by the electronic component and presses the electronic component against a second side opposite to the first side.

2. The socket of claim 1, wherein the housing has a recessed portion in the first surface of the bottom plate portion in which the spring member is positioned.

3. The socket of claim 2, wherein the spring member is supported by the frame body portion while being positioned in the recessed portion.

4. The socket of claim 1, wherein the bottom plate portion has a first depressed portion adjacent of each of the contact support holes, formed in the first surface to a depth less than a thickness of the bottom plate portion in a direction of the second surface, in which the free end of the first contact portion is accommodated after being elastically deformed by the electronic component.

5. The socket of claim 4, wherein the bottom plate portion has a second depressed portion adjacent of each of the contact support holes, formed in the second surface to a depth less than a thickness of the bottom plate portion in a direction of the first surface, in which the free end of the second contact portion is accommodated after being elastically deformed by the circuit board.

6. The socket of claim 1, wherein the spring member extends from a right side to a left side and has the supported portion on each of the right side and the left side.

7. The socket of claim 6, wherein the spring member has the spring portion in a central position between the left side and the right side.

8. The socket of claim 7, wherein the spring portion projects further toward the second side than the supported portion.

9. The socket of claim 8, wherein the frame body portion supports the supported portion.

10. The socket of claim 1, wherein the spring member extends in a horizontal direction in a shape of a cantilever.

11. The socket of claim 10, wherein the spring member has the spring portion at a free end of the cantilever.

12. A socket, comprising:

a housing including a bottom plate portion and a frame body portion extending from a plurality of edges of the bottom plate portion; and a spring member including:

a supported portion supported by a first side of the frame body portion; and a spring portion extending toward a second side of the frame body portion opposite to the first side, the supported portion including a first supported portion extending obliquely from the first side of the frame body portion in a direction toward the second side of the frame body portion, and a second supported portion extending obliquely from the first side of the frame body portion in a direction toward the second side of the frame body portion, the spring portion supported on each of a first side and a second side thereof by a respective one of the first and second supported portions.

13. The socket of claim 12, wherein the frame body portion and the spring member are a locator in an in-plane direction of the bottom plate portion in mounting an electronic component in the socket.

14. The socket of claim 13, wherein the spring portion elastically deforms by being pushed by the electronic component and presses the electronic component against the second side of the frame body portion.

15. The socket of claim 13, further comprising a plurality of contacts supported by the bottom plate portion, the contacts contact a plurality of contact pads formed on a lower surface of the electronic component.

16. The socket of claim 12, wherein the bottom plate portion and the frame body portion are integrally formed.

17. The socket of claim 12, wherein the spring member has the spring portion in a central position between the first and second supported portions.

18. The socket of claim 12, wherein the spring portion projects further toward the second side than the supported portion such that the spring portion is elastically deformable in a direction toward the first side of the frame body portion against an elastic return force of the supported portion.

19. The socket of claim 12, wherein each of the first supported portion and the second supported portion are removably attached to the first side of the frame body.

20. The socket of claim 19, wherein the frame body defines supporting portions receiving free ends of the first supported portion and the second supported portion for fixing the free ends of the first and second supported portions to the frame body.

* * * * *